US010786816B2

(12) United States Patent
Cecchi et al.

(10) Patent No.: US 10,786,816 B2
(45) Date of Patent: Sep. 29, 2020

(54) DEVICE FOR SEPARATING PLANTS AND THE PLANT BYPRODUCT

(71) Applicants: Michael Cecchi, Longboat Key, FL (US); Paige Cecchi, Madison, CT (US)

(72) Inventors: Michael Cecchi, Longboat Key, FL (US); Paige Cecchi, Madison, CT (US)

(*) Notice: Subject to any disclaimer, the term of this patent is extended or adjusted under 35 U.S.C. 154(b) by 805 days.

(21) Appl. No.: 15/256,586

(22) Filed: Sep. 4, 2016

(65) Prior Publication Data

US 2018/0065124 A1    Mar. 8, 2018

(51) Int. Cl.
| B02C 23/10 | (2006.01) |
| A23N 15/00 | (2006.01) |
| B02C 18/06 | (2006.01) |
| B02C 18/22 | (2006.01) |
| B02C 23/14 | (2006.01) |
| B62B 3/10 | (2006.01) |
| B62B 5/06 | (2006.01) |

(52) U.S. Cl.
CPC .............. B02C 23/10 (2013.01); A23N 15/00 (2013.01); B02C 18/06 (2013.01); B02C 18/2275 (2013.01); B02C 23/14 (2013.01); B07B 2201/04 (2013.01); B62B 3/104 (2013.01); B62B 5/06 (2013.01)

(58) Field of Classification Search
CPC ..... B02C 23/10; B02C 18/06; B02C 18/2275; B02C 23/14; B62B 3/104; B62B 5/06; B07B 2201/04; A23N 15/00
See application file for complete search history.

(56) References Cited

U.S. PATENT DOCUMENTS

| 1,228,800 | A | * | 6/1917 | Marshall | ............... B07B 1/22 |
| | | | | | 209/284 |
| 3,729,096 | A | * | 4/1973 | Fitzner | ................. B07B 1/22 |
| | | | | | 209/664 |
| 4,381,669 | A | * | 5/1983 | Peters | .................... B07B 1/06 |
| | | | | | 209/237 |
| 5,222,605 | A | | 6/1993 | Pogue | |
| 6,036,126 | A | | 3/2000 | Cappola | |
| 6,851,566 | B1 | * | 2/2005 | Bonner | ................ A47J 47/18 |
| | | | | | 220/23.87 |
| 6,892,516 | B1 | * | 5/2005 | Ardagna | .............. A01B 1/00 |
| | | | | | 209/421 |

(Continued)

FOREIGN PATENT DOCUMENTS

| GB | 809777 | 3/1959 |
| GB | 967495 | 8/1964 |

OTHER PUBLICATIONS

PCT/US2017/042700, International Search Report and Written Opinion of International Searching Authority dated Oct. 6, 2017.

*Primary Examiner* — Jonathan G Riley
(74) *Attorney, Agent, or Firm* — Michael A. Blake

(57) ABSTRACT

A device for separating plants and plant byproduct, the device comprising: a housing; a basin located in the housing, the basin configured to hold plant material; at least one rotating arm located in the basin; a shelf located below and adjacent to the basin, the shelf comprising a plurality of shelf holes; a blade configured to cut material extending below the shelf through the shelf holes; a first sieve located below and generally adjacent the shelf, the sieve containing a plurality of holes of a first sieve hole size; and a bottom container located below the sieve.

9 Claims, 5 Drawing Sheets

(56) References Cited

U.S. PATENT DOCUMENTS

| | | | | |
|---|---|---|---|---|
| 7,168,643 B2* | 1/2007 | Mercier | | A01D 46/005 |
| | | | | 241/169.1 |
| 8,555,781 B1* | 10/2013 | Garcia | | B30B 9/3092 |
| | | | | 100/223 |
| 9,832,937 B2* | 12/2017 | Schroeder | | B26B 19/28 |
| 2003/0102644 A1* | 6/2003 | Figueroa | | B62B 3/104 |
| | | | | 280/47.35 |
| 2004/0245735 A1* | 12/2004 | Pins | | B62B 1/142 |
| | | | | 280/79.5 |
| 2009/0161102 A1 | 6/2009 | Deppermann | | |
| 2011/0162539 A1* | 7/2011 | Youn | | A23N 5/006 |
| | | | | 99/631 |
| 2013/0313029 A1* | 11/2013 | Franco | | B62B 3/002 |
| | | | | 180/65.1 |
| 2014/0004856 A1* | 1/2014 | Gupta | | H04W 24/02 |
| | | | | 455/434 |
| 2014/0048456 A1* | 2/2014 | Adams, Sr. | | B07B 1/06 |
| | | | | 209/325 |
| 2014/0209718 A1* | 7/2014 | Bevins | | B09B 5/00 |
| | | | | 241/24.11 |
| 2014/0216989 A1* | 8/2014 | Raichart | | B07B 1/26 |
| | | | | 209/235 |
| 2014/0331837 A1* | 11/2014 | Holcomb | | B26D 1/38 |
| | | | | 83/104 |
| 2015/0027096 A1* | 1/2015 | Black | | A01D 34/82 |
| | | | | 56/10.1 |
| 2015/0047485 A1* | 2/2015 | Schroeder | | A23N 15/06 |
| | | | | 83/104 |
| 2015/0273527 A1* | 10/2015 | Kelly | | A01D 46/02 |
| | | | | 209/288 |
| 2015/0298135 A1* | 10/2015 | Spielman | | B02C 18/08 |
| | | | | 241/101.01 |
| 2016/0039105 A1* | 2/2016 | Raichart | | B26D 1/147 |
| | | | | 83/13 |
| 2017/0232627 A1* | 8/2017 | Raichart | | B26D 1/147 |
| | | | | 83/13 |
| 2018/0339298 A1* | 11/2018 | Mayers | | G01G 17/02 |
| 2019/0255570 A1* | 8/2019 | Koerner | | B07B 1/02 |

* cited by examiner

DEVICE FOR SEPARATING PLANTS AND THE PLANT BYPRODUCT

TECHNICAL FIELD

This invention relates to a device which will process cannabis plants, its parts and the bud and will trim buds in order to enhance their appearance for sale, and will process the parts or buds in order to recover the byproducts of this trimming process, to be used in the manufacturing of rolled, oils, edibles and other cannabis related products.

BACKGROUND

Current social and political matters have opened up the marijuana and cannabis industry to both medical use and recreational use. This increase in demand for the products and byproducts of the plants have led to the development of several systems for the trimming and processing of the cannabis plants and buds and for the collection of the buds materials and byproducts of these buds as they are being processed.

The current systems used in the marketplace are methods and technology for the processing of the plants, buds and the byproducts that are recovered during the trimming process.

The current marketing techniques of cannabis buds, in the recreational area, has need for the buds to be trimmed or cleaned up before they are shown at the dispensaries to the consumer public. The cleanliness and presentation of these cannabis buds make certain strains or buds more desirable to the consumer due to the aesthetic quality of the plant. This method of trimming of the buds allows the manufacturer to recover the byproducts at various levels and in particulate size. These byproducts are segregated at this time in order to collect the more desirable, more valuable byproducts such as the 'kid' of the plant, the crystal formations of the plant and the materials from these trimmings that may be used in the manufacturing of hashish and oils, used in edibles and liquid pens.

Several problems face the current methods of processing cannabis plants, buds and the byproducts. During the handling process, handlers may be subject to the pollen, pesticides and any other allergens which may be part of the plant or become part of the plant by the grow process or the pesticide treatment process that is released into the air when the marijuana is being processed.

An additional problem facing the current processing and handling methods is that these buds removed from the live plants, are subject to rapid deterioration when exposed to heat, light, humidity and handling. The current systems expose the plant products to an undue amount of light, factory air, fumes and volatile organic compounds being cast of by the equipment, workers and other process within the same environment.

The current systems for handling and processing cannabis buds is not an effective method for handling the cannabis materials, as it is wide open to the air pollutants and factory environment, because it utilizes an open collecting system as well as several types of separation bags of various whole sizes which will allow the byproducts to be separated according to their particulate size. The bag system exposes the leaves to sunlight and excessive handling whereby in order for them to be removed from the bag system they are exposed to air light and other products which may be within the air environment of the processing facility. Currently, the bags used in processing the trimmings are simply dumped on to an open tables or processing benches and then collected from these processing branches by the person handling the trimmings, in an open air environment.

Another problem facing current trimming machines and handheld trimming devices, is that they are dangerous those who operate them. The blade system and methods of handling the products is simple unsafe to the user and exposes the operators to physical injury.

Another problem in the use of the current machines is that they release into the surrounding environment undesirable allergens and pollens that are released form the marijuana plants, leaves and buds, as they are processed.

It would be highly desirable to process the marijuana cannabis plants, buds, trimmings and the byproducts of these trimmings in a much more contained system whereby it will protect the worker from exposure to the allergens casted off by the process, protect the plants and buds during this process, and to be able to collect the buds and byproducts of the trimming in a more sophisticated method, which will also keep those trimming byproducts from the exposure to light, humidity, temperature fluctuations and excess handling.

It would be highly desirable to have a device for the processing of cannabis, which is safe for the user, and can enhance the appearance of the bids, collect the byproducts, and is able to grind the materials, using all the material entered into byproducts.

Thus there is a need for a device for separating plants and plant byproduct that overcomes the above listed and other disadvantages.

SUMMARY OF THE INVENTION

The disclosed invention relates to a device for separating plants and plant byproduct, the device comprising: a housing; a basin located in the housing, the basin configured to hold plant material; at least one rotating arm located in the basin; a shelf located below and adjacent to the basin, the shelf comprising a plurality of shelf holes; a blade configured to cut material extending below the shelf through the shelf holes; a first sieve located below and generally adjacent the shelf, the sieve containing a plurality of holes of a first sieve hole size; and a bottom container located below the sieve.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
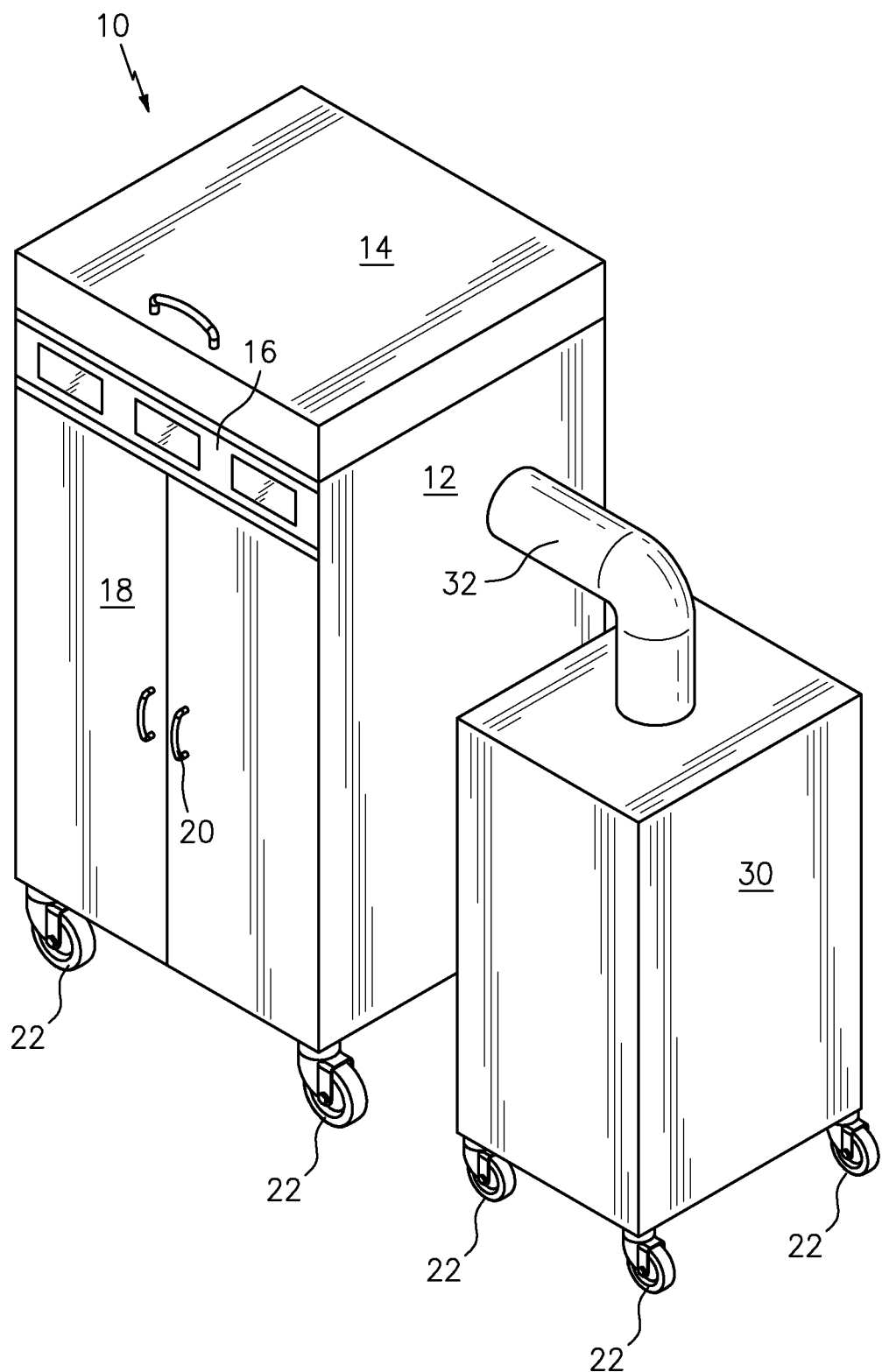
FIG. 1 is a perspective view of one embodiment of the device for separating plants and plant byproduct.

It would be highly desirable to process the marijuana cannabis plants, buds, trimmings and the byproducts of these trimmings in a much more contained system whereby it will protect the worker from exposure to the allergens casted off by the process, protect the plants and buds during this process, and to be able to collect the buds and byproducts of the trimming in a more sophisticated method, which will also keep those trimming byproducts from the exposure to light, humidity, temperature fluctuations and excess handling.

It would be highly desirable to have a device for the processing of cannabis, which is safe for the user, and can enhance the appearance of the bids, collect the byproducts, and is able to grind the materials, using all the material entered into byproducts.

The invention is a device for the processing of cannabis plants, plant parts and buds, whereby these materials are placed into upper portion of the invention, are then rolled or emulsified into a series of byproducts through a cutting system, during this process, these buds are collected and the byproducts are then collected in a series of containers, containing various size sieves, to collected the various sizes, to be later used in the production of cannabis products, such as rolled products, edibles, oils, hashish and other cannabis products that will then be sold into the marketplace.

The invention incorporates a system and method for the processing of the plants and buds, which in the industry is termed "trimming", in order to produce a much more visually desirable cannabis bud for the consumers to purchase as well as to be able to recover the valuable and varied use byproducts of the bud.

The invention will allow the easy trimming of the buds while containing these trimmings in a closed system which will protect these trimmings from light, heat, humidity, and to also importantly protect the handler from the allergens, pesticides and other materials which may be released from the product during the process.

One embodiment of the invention is a sealed processing portion of the invention, which will incorporate the processing of the buds through a trimming technique, as well as collecting the buds trimmings and byproducts through multiple sized holes in sieves of the collecting canisters. The collection canisters may have different sized holes in the sieve to collect different sized particles at each level.

The invention allows the user to choose various hole sizes of the sieves or screens that are used to collect the various byproducts and thereby would allow the user to predetermined what size or what type of byproducts they intend on collecting at any particular time.

The invention will allow the user to simply collect the byproducts in the container system of the invention and to be able to collect these products in a closed-door concealed containment system and be able to be moved in a covered, contained system, which will protect the byproducts as well as the operators and handlers. This will greatly increase the handling efficiencies of the products as well as they allow a more simpler and improved system for the containment of the products, while protecting the operators and products.

Shown in FIG. 1 is a perspective view of the invention 10. The invention 10 is a freestanding or attachable device for the processing of plants, and in particular's cannabis plants and buds, to be cleaned up trimmed or emulsified and to be able to recover the byproducts in a systematic system, as well as to be able to clearly identify the product as it moves through the process. Identification of the cannabis materials is important to the industry. The invention can monitor and follow the cannabis products from their entry into the process, while they are in the process and through to packaging, and through delivery of the products. This is important to the current federal regulations requiring processing companies to be able to follow the product throughout the process, and within the seed-to-sell requirements.

The invention 10 has a body 12 and a lid 14 for containing and covering the products. There may be a handle 20 on top of the lid 14 to allow access into the interior of the body 12. On the front of the body 12 are controls and displays or readouts 16. There is a set of doors 18 with handles 20 which will open to give access to the interior of the body 12.

This embodiment also shows an air-cleaning device 30 attached to the body 12 via a connection 32. This air-cleaning device 30 is attached to the body 12 in order to remove harmful emissions from the buds, leaves, twigs and plant parts as they are processed in the system. These plant parts will contain allergens, bacteria, possibly pesticides, which may be released from the plant parts and would then be within the worker's environment and are possible health risk.

Figure 2:
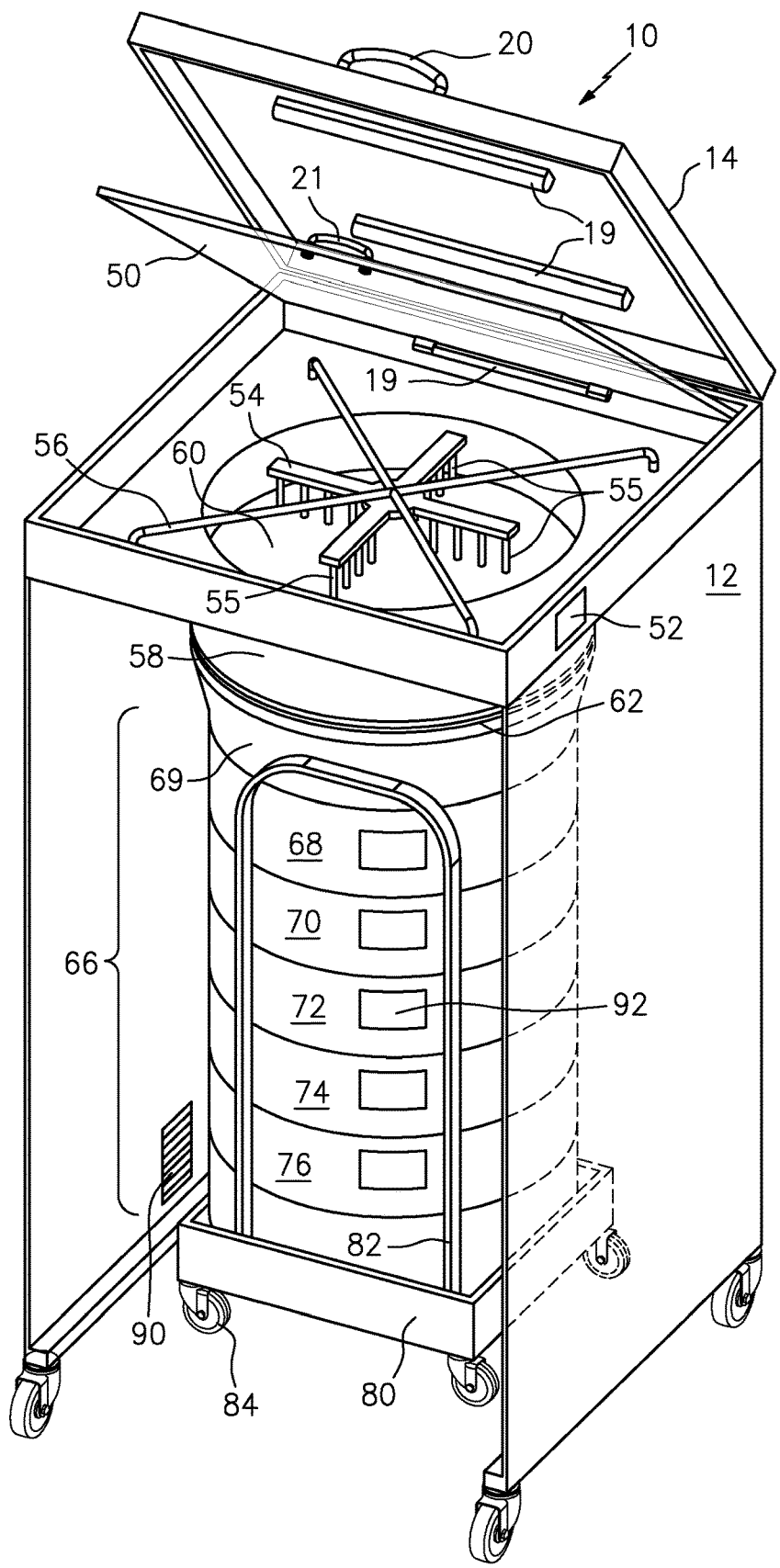
FIG. 2 is a view of the interior of the housing of the device for separating plants and plant byproduct.

FIG. 2 shows the invention 10 with the doors 18 removed and the lid 14 raised. The invention 10 has a lid 14 which has a handle on it 20. Inside under the lid 14 may be a transparent second lid 50. The second lid may be made out of any suitable material, including but not limited to a clear poly carbonate. The transparent second lid 50 provides for the containment of the product while being processed as well as allow the operators two view the process as it is working. Both lids will be attached to or coordinated with cut-off switches 52. These cutoff switches will stop the process if either of the lids 14 or the transparent lid 50 are opened or are ajar. These features are important for the safety protection of the workers and the users and therefore are included in this embodiment.

In one embodiment there may be a UV light source 19 contained in the upper lid for the decontamination of the products within. This light source 19 may be contained within the lid 14, or in other embodiments, at other locations on the body 12.

The body 12 may contain a basin 60 where plant material, such as, but not limited to cannabis bud, may be deposited for processing. This basin 60 may be made out of any suitable material, including but not limited to: stainless steel, polycarbonates and/or other plastics or metals. Within this basin 60 is a moving arm and brush assembly 54, which comprises a motor that rotates the brushes 55 in the basin 60. The arm and brush assembly 54 are configured to move the cannabis buds within the basin 60. A support bracket 56 supports the moving brush system 54, and is configured to make the brush assembly 54 easily replaceable as well as easy to repair. At the bottom of this basin 60 is a shelf 58. The buds will move on the shelf via the brush assembly, the shelf 58 has multiple sized holes, of various sizes and dimensions which will allow the edges of the buds, to pass through these holes and to be trimmed, and not fall through these holes. This will allow a cutting blade 62 placed closely beneath shelf 58 to trim the cannabis buds. Small parts extending from the buds are exposed to the cutting blade 62 through the holes within shelf 58, and these small parts are trimmed off from the buds. As the buds are trimmed these byproducts fall down through a collection chute 69 and into a series of sieves 68, 70, 72, 74 and a collection container 76 at the bottom of the body 12. The collection container 76 may be generally the same size and materials as the sieves, but the collection container 76 has a solid bottom to contain the plant matter. These sieves 68-74 and container 76 may sit on a rolling cart 80, which has a handle 82, and a set of wheels 84. This cart 80 will allow the sieves to be easily removed and transported once the cannabis buds have been processed. Attached to the cart 80 and or the body 12, is an agitator 90, which will vibrate and shake the sieves 68-74, allowing the trimmings to fall down toward the bottom and will help the byproducts to pass through the sieves. The top sieve 68 may have cover placed on top of the sieve 68 (not shown) during the moving process. This cover will allow the products to remain intact and not be exposed to the detrimental lights, warehouse contaminants and conditions of the processing area.

The sieves 68-74 may comprise various sized sieve-screening materials, which will have various, and different size openings to allow the separation of the cannabis trimmings into various size categories. In one embodiment the first sieve 68 would be a particular chosen size, to catch a particular byproduct size, and to allow smaller pieces to fall through to the next sieve, below. The second sieve in line 70 would have a slightly smaller sized opening to catch the size of the byproducts intended for that sieve, as well as let the smaller byproducts pass-through 72, 74 and then to have the smallest particles to be collected in canister 76, which has a solid bottom. In this invention, this bottom collection canister 76 will collect, what is known as 'Kief' and the crystal formations of the cannabis plant.

Having different sizes of sieves, and collecting the plant by-product in various sieves and at generally different sizes, allows the user to readily segregate and collect the more valuable byproducts, so the plant by-product can be separated and sold separately.

These byproducts may end up being used for rolling cigarettes, used in making oils and hashish. The use of these byproducts and manufacturing such oil increases the overall value of the plants and buds and of the process. The buds that are trimmed and remain in the basin 60 may be removed and eventually packaged and sold as buds. Currently, dispensaries display these buds to the buyers and it is known that the better-looking buds can demand a higher sale price.

The sieve openings may vary from about 0.009 inches to about 0.10 inches; however other suitable sieve opening sizes may be used.

Figure 3:
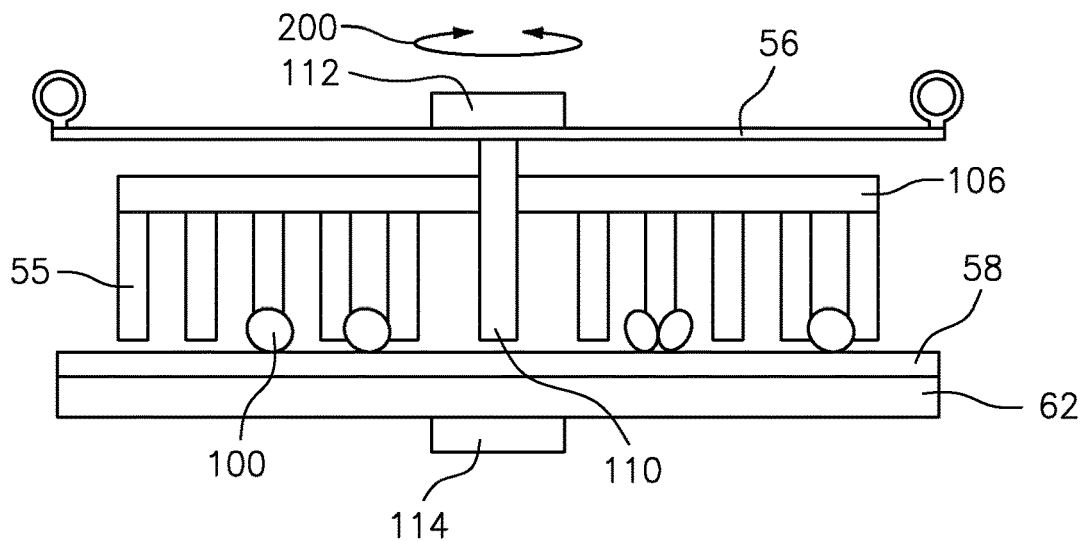
FIG. 3 is a side view of the basin and rotating arm.

FIG. 3 shows an embodiment of the invention as it relates to processing the cannabis plant, which includes its stems, leaves and the buds to give the end-user the ability to process and recover the plant and plant parts in what they wish as a sellable or usable byproduct. In this embodiments, the moving arm and brush assembly 54, which included brushes 55 for tumbling the buds as well as a motor 112 for moving the arms 106 with the brushes 55 on, as shown in FIG. 2, also include a support bracket 56, a motor 112, a support arm 106, and dangling brushes 55 which are used to move the buds 100 on top of the shelf 58 with the cutting blades 62 beneath the shelf 58. This configuration as for arms that move together. The shelf 58 will have various size holes from about one quarter inch to about one inch which will allow the edges of these buds 100 to pass through these holes and then to be trimmed by the blade 62 which is below the shelf 58. The motor 112 is used to turn the arms 106 holding the brushes 5. The motor 114 which is mounted below the blade 62 is used to spin the blade 62. An additional arm 110 may be present to assist in moving the buds 100. The arm 110 may extend along the diameter of the shelf 58.

The blade 62 may contain multiple size holes as well as multiple shaped holes in order to better trim the buds being processed.

Figure 4:
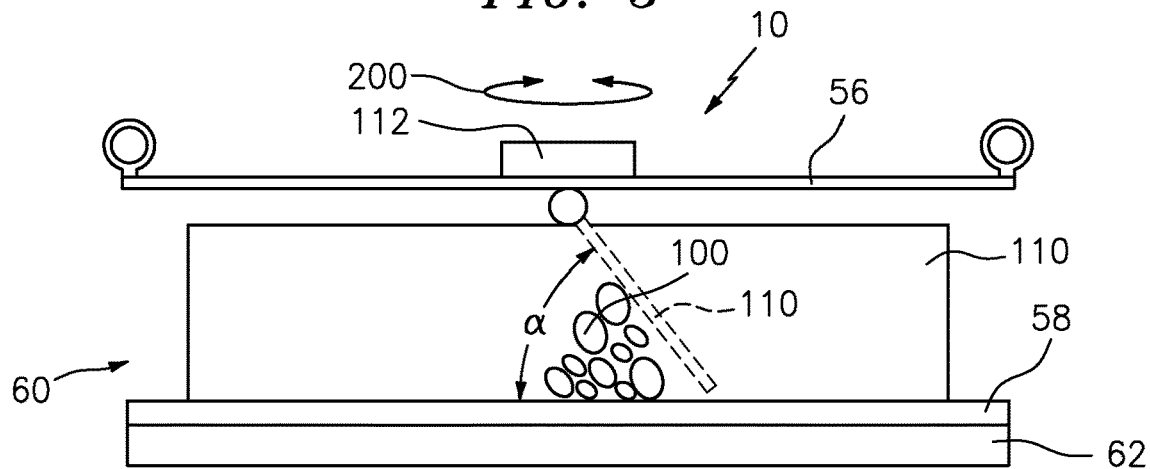
FIG. 4 is a side view of the basin and another embodiment of the rotating arm.

FIG. 4 shows an additional embodiment of the invention 10. In this view the arm 110 is shown generally perpendicular to the direction of the line of sight of the viewer, and the arm is shown in dashed line when the arm is generally parallel to the direction of the line of sight of the viewer. In this embodiment, the arm 110 is configured be at an angle α, which is an acute angle to the shelf 58 as shown. The arm 110 is also configured to rotate, the direction of rotation generally in a plane parallel to the shelf 58. The direction of rotation may be in the direction of the arrow 200. The angle α allows the arm 110 to create a downward force on the buds 100, to maximize cutting by the blade 62 as the arm 110 is being rotated. In this embodiment, the user may wish to process the entire cannabis bud or plant parts through the shelf and blade system in their entirety. This application may be better used to manufacturer larger quantities of the needed materials to utilizing as much of the plant as possible for rolled cannabis products and large volumes of oils. In this embodiment the arm 110 is configured to move and push the plant parts and/or buds 100 more aggressively against the shelf 58 to be cut by the blade 62.

The slanted rotating arms 120 are fairly stiff and are used to drive the buds and plant parts down through the shelf xx to be cut or emulsified by the blade xx in its entirety. The material that is processed will again be collected in sieves as described in FIG. 2.

Figure 5:
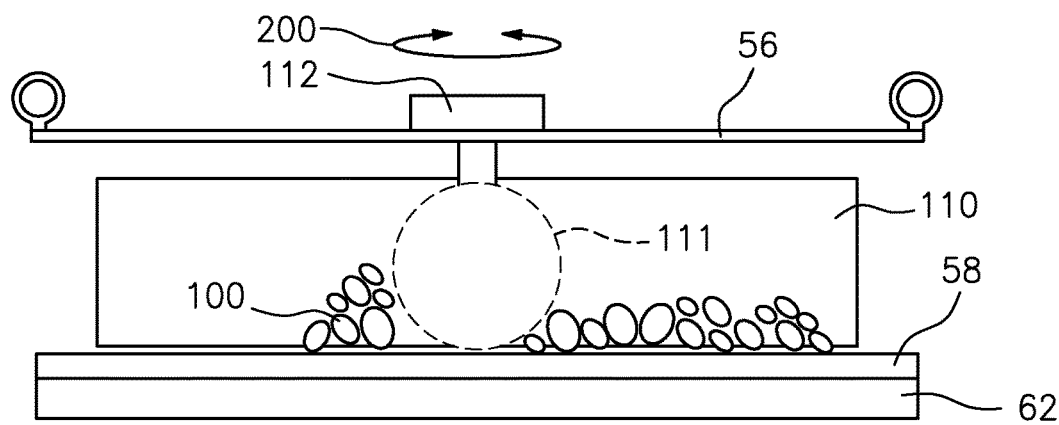
FIG. 5 is a side view of the basin and another embodiment of the rotating arm.

FIG. 5 is an additional embodiment of the moving arm system which will rotate the buds 100 and plant materials within the invention 10. In this embodiment a moving arm 111 is shown. In this view the arm 111 is shown generally perpendicular to the direction of the line of sight of the viewer, and the arm is shown in dashed line when the arm is generally parallel to the direction of the line of sight of the viewer. In this view, it can be seen that the arm 110 has a generally cylindrical shape. The cylindrical shaped arm 110 will move over the material 100 and forced the materials 100 to go through the shelf 58 and to be cut by the blade 62. The cylindrical arm 110 roller may be smooth or have pronounced features that will help to force the material 100 through the shelf 56 and to the blade 62. The size of the holes in the shelf 56 and the blade 62 may vary according to the individual needs of the product for end-use. The cylindrical arm 111 may rotate in the direction of the arrow 200.

The invention is unique in a that it allows a safe working environment for the users and will not expel contaminates in the workers environs, as well as to allow the materials to be readily processed, separated by the needs to the user and to be safely and easily transported. The invention may have an identification system to allow the product to be tracked and to help comply with the current regulations on cannabis production and tracking. The product itself is protected from outside influences, once it is processed and therefore is safer.

Figure 6:
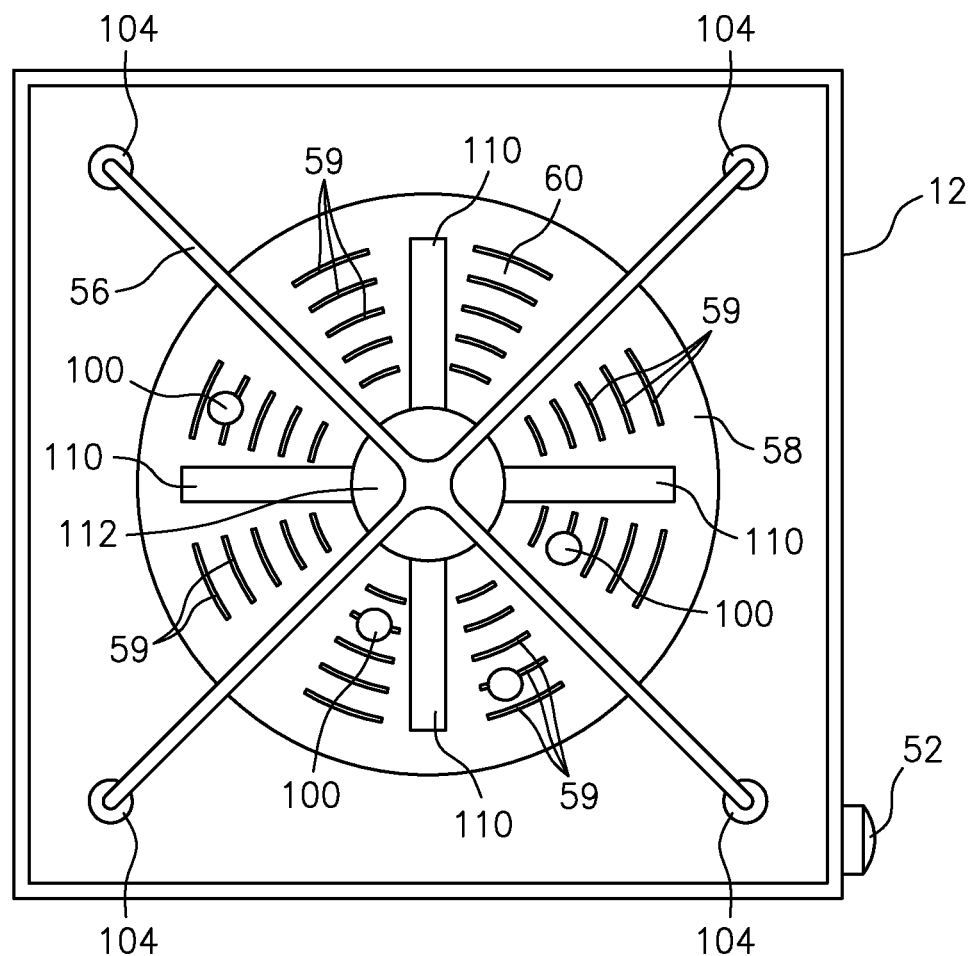
FIG. 6 is a top view of the rotating arms.

FIG. 6 shows a top view of the invention 10. In this view one can see the body 12 and the basin 60. The buds 100 will start in the basin during the processing of the buds 100. The invention may have a cut-off switch 52, which will shut the system off when the lid is raised. Support brackets 56 are attached to the body 12, via attachment means 104. Supported by the support brackets 56 is the motor 60. The motor 60 is configured to rotate the arms 110. The rotating arms 110 move the buds 100, in a circular motion on the shelf 58, which contains holes 59, which allow the edges of the buds 100 to pass through in order to be trimmed. The holes 59 may have any suitable shape, in one embodiment shown, the holes 59 have a crescent shape or arc shape.

Figure 7:
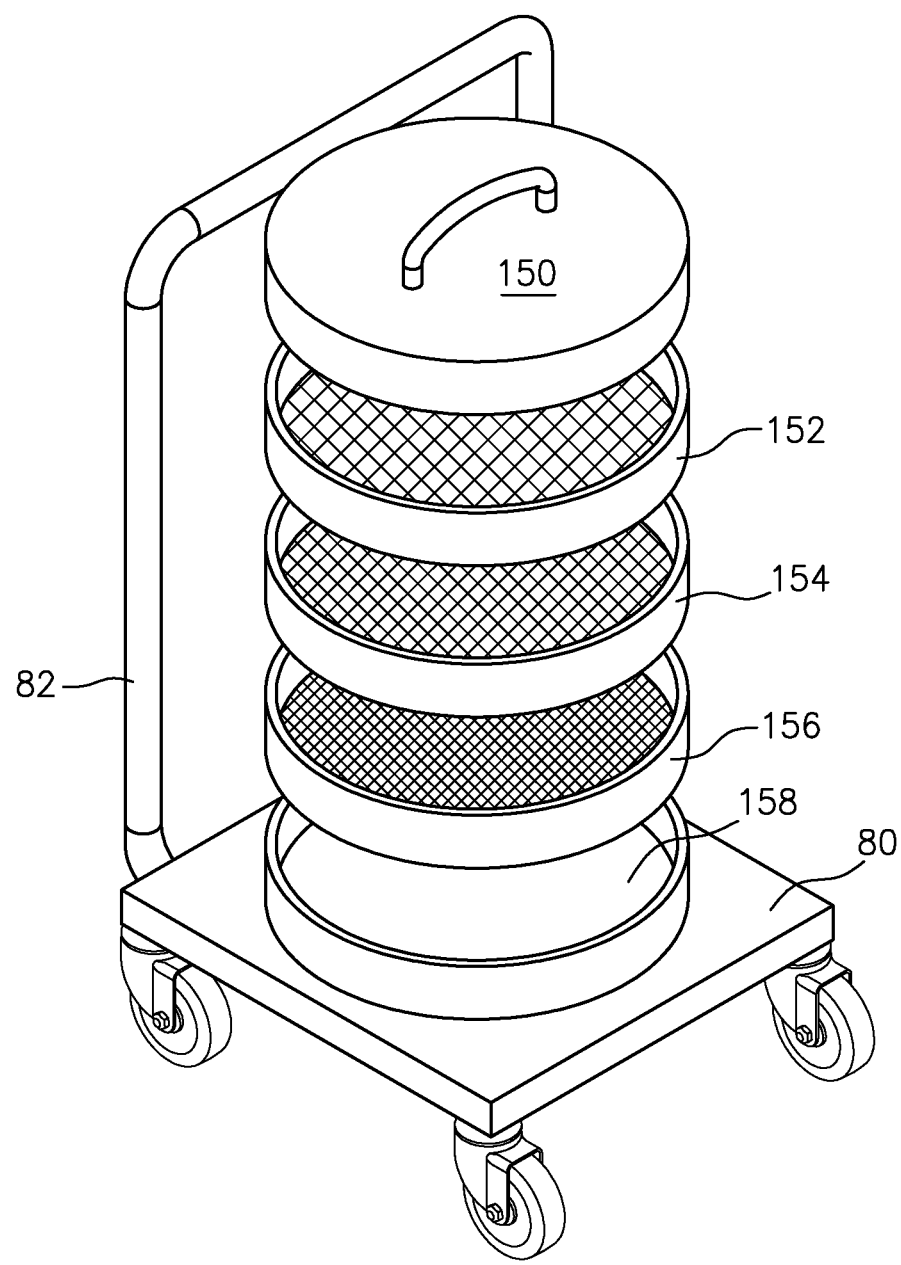
FIG. 7 is a perspective view of the sieves.

FIG. 7 shows another embodiment of the invention, with several sieves 152, 154, 156, and solid container 158 on the rolling cart 80 with handle 82. In this embodiment, there is a solid cover 150 a first sieve 152, a second sieve 154, a third sieve 156 and a solid bottomed container 158. In this example sieve 152 may be made of a wire mesh about 12×12 per inch, with an opening of about 0.0152 square inches. The second sieve 154 may have a 30×30 per inch wire mesh, with an opening of about 0.0213 square inches; the third sieve 156 may have a 50×50 per inch mesh count with an opening of about 0.009 square inches. The solid bottom container 158 is configured to collect the smallest particles. The shape of the sieves 152, 154, 156 and container 158 may be round, square, or any other suitable shape.

This invention has many advantages. The various size sieve openings will allow the trimmings and their various sizes to fall through these openings. The materials gained or collected at each sieve level and from each sieve allow the products within each to be rapidly separated and organized. The byproducts collected from the sieves will be used in rolled cannabis product, used to manufacture oils, edibles and other products that can be made from the trimmings. This system allows portability and protection during the manufacturing process. It also maintains the integrity of the product the identification of the product and keeps the harmful effects of the product away from the worker and the work is environment.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A device for separating plants and plant byproduct, the device comprising:
    a housing;
    a basin located in the housing, the basin configured to hold plant material;
    a transparent lid rotatably attached to the housing and located above and adjacent to the basin and configured to allow one to look through the transparent lid into the basin;
    at least one rotating arm located in the basin;
    a shelf located below and adjacent to the basin, the shelf comprising a plurality of shelf holes;
    a blade configured to cut material extending below the shelf through the shelf holes;
    a collection chute, with a top portion and a bottom portion, the top portion in communication with the shelf;
    a first sieve located below the shelf and in communication with the bottom portion of the collection chute, the sieve containing a plurality of holes of a first sieve hole size;
    a second sieve located below the first sieve, and generally adjacent to the first sieve, the second sieve containing a plurality of holes of a second sieve hole size, the second sieve hole size being smaller than the first sieve hole size;
    a bottom container located below the sieves; and
    an agitator located on the housing, the agitator configured to vibrate and shake the sieves such that plants and plant byproduct smaller than the sieves holes of each sieve, will fall through the sieves, until the plants and plant byproduct are sorted by size in each sieve and the bottom container, and
    a wheeled cart removably located within the housing, and with the first sieve, second sieve, and bottom container removably attached to the wheeled cart, the wheeled cart configured to be rolled out of or into the housing.

2. The device for separating plants and plant byproduct of claim 1, further comprising:
    a third sieve located below the second sieve, and generally adjacent to the second sieve, the third sieve containing a plurality of holes of a third sieve hole size, the third sieve hole size being smaller than the second sieve hole size;
    a fourth sieve located below the third sieve, and generally adjacent to the third sieve, the fourth sieve containing a plurality of holes of a fourth sieve hole size, the fourth sieve hole size being smaller than the third sieve hole size.

3. The device for separating plants and plant byproduct of claim 1, further comprising:
    an air cleaning device in fluid communication with the interior of the housing.

4. The device for separating plants and plant byproduct of claim 1, further comprising:
    a brush attached to the rotating arm.

5. The device for separating plants and plant byproduct of claim 1, further comprising:
    a plurality of brushes attached to the rotating arm.

6. The device for separating plants and plant byproduct of claim 1, wherein the rotating arm is at an acute angle to the shelf, and the arm is abutting the shelf.

7. The device for separating plants and plant byproduct of claim 1, wherein the rotating arm has a cylindrical shape, and is abutting the shelf.

8. The device for separating plants and plant byproduct of claim 1, further comprising:
    a UV light located in the housing.

9. The device for separating plants and plant byproduct of claim 1, further comprising wheels located at the bottom of the housing configured to allow the device to be portable via rolling.

* * * * *